March 29, 1927.
J. N. GOSSETT
LAMP SUPPORTING COLLAR
Filed July 17, 1926
1,623,002
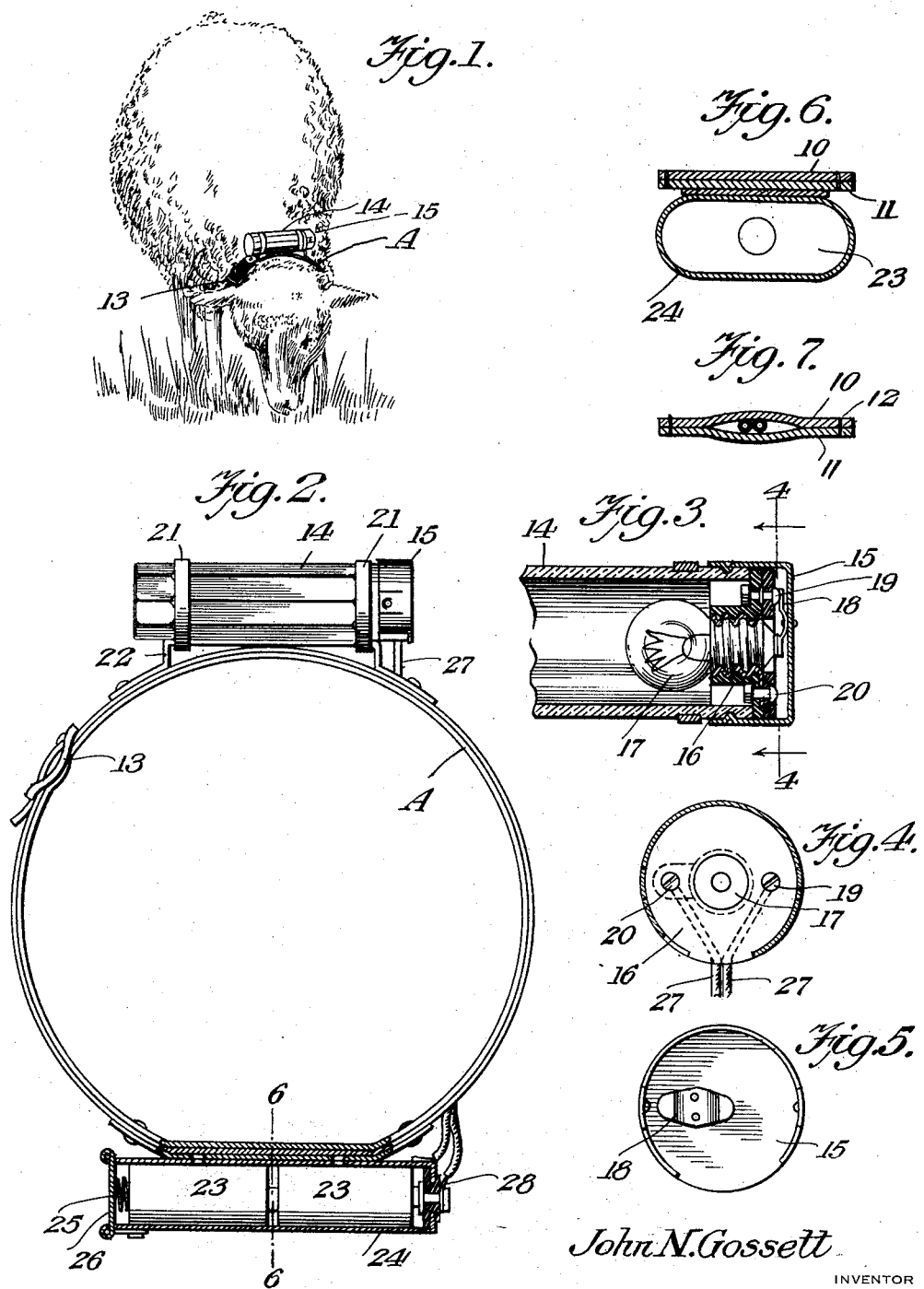
John N. Gossett
INVENTOR
BY Victor J. Evans
ATTORNEY Patented Mar. 29, 1927.

1,623,002

UNITED STATES PATENT OFFICE.

JOHN N. GOSSETT, OF SHERIDAN, MONTANA.

LAMP-SUPPORTING COLLAR.

Application filed July 17, 1926. Serial No. 123,114.

This invention contemplates the provision of an illuminated collar primarily designed to be applied to sheep, whereby the latter may be easily located at night time should they wander away beyond reasonable distances from where they are put, and also serve as a protection to the sheep against injury by others.

In carrying out the invention, I contemplate the use of a collar upon which an electric lamp is supported, the current for which is obtained from a small battery arranged in a suitable casing also carried by the collar, and designed to permit the battery to be quickly and conveniently replaced when necessary.

In the drawing forming part of this application like numerals of reference indicate similar parts in the several views and wherein:

Figure 1 is a view showing the application of the invention.

Figure 2 is a view of the collar removed.

Figure 3 is a fragmentary sectional view through the lamp.

Figure 4 is a sectional view on line 4—4 of Figure 3.

Figure 5 is a bottom plan view of the cap for said lamp.

Figure 6 is a sectional view on line 6—6 of Figure 2.

Figure 7 is a sectional view through the collar.

Referring to the drawing in detail A indicates generally a collar of any ordinary construction preferably made up of separate pieces of leather or other suitable material 10 and 11 respectively which are stitched or otherwise secured together as at 12. The collar is provided with a buckle 13 whereby the same can be conveniently attached to or removed from the animal as the occasion may require.

Carried by the collar is an electric lamp, which may vary in size and configuration without departing from the spirit of the invention, but which lamp preferably is cylindrical in cross section as shown. The lamp comprises a transparent body portion 14 which is closed at one end by a cap 15, the latter being threaded or otherwise suitably secured to the lamp body as shown in Figure 3. Arranged upon the open end of the body is a socket and holder 16 for an electric light bulb 17, while carried by the under side of the cap is a resilient contact 18 for engagement with the adjacent binding post 19, the other post being indicated at 20. By removing the cap 15 access may be readily had to the bulb 17 and the socket therefor as will be readily understood. While the lamp may be supported in various ways, I preferably make use of spaced bands 21 which receive and support the body of the lamp, these bands being carried by brackets 22 attached to the collar as shown. When the collar is placed on the animal the lamp is arranged across the neck thereof as shown in Figure 1, occupying the position where it can be readily seen by everyone within reasonable distances.

The current for the lamp is supplied by the cells 23 of a battery, which cells are adapted to be positioned within a suitable casing 24 secured to the collar as shown in Figure 2. These cells are arranged in end to end relation within the casing and held in proper position with relation to each other by means of a spring 25 carried by the pivoted closure 26 for one end of the casing as illustrated. The wires 27 connected with the binding posts 19 and 20 respectively are connected with the battery as at 28, these wires being preferably arranged between the sections 11 and 12 of the collar as shown in Figure 7, projecting from between the sections for connection with the battery. Manifestly the cells of the battery can be conveniently and quickly placed within the casing when use of the same are desired, and when the collar is placed upon the neck of the animal, and the lamp lighted, it serves the purposes hereinabove specified.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. A collar adapted to be placed around the neck of an animal, and including inner and outer pieces stitched along their marginal edges, a battery casing attached to the collar, brackets secured to the collar and projecting outwardly therefrom, spaced annuli carried by the brackets and arranged at a right angle to the collar, an electric lamp received and supported by said annuli and arranged diametrically opposite the battery casing, a battery arranged in said casing, and electric wires leading from the battery to the lamp and wholly arranged between the inner and outer pieces of the collar.

2. A collar adapted to be placed about the neck of an animal and including inner and outer pieces stitched along their marginal edge, a battery casing supported by the collar, a pair of brackets projecting outwardly from the collar, spaced annuli supported by the brackets, an electric lamp received and supported by said annuli and including a bulb, a removable cap electrically connected with said bulb, a battery arranged in said casing, and electric wires leading from the battery to said cap and disposed between the inner and outer pieces of the collar.

In testimony whereof I affix my signature.

JOHN N. GOSSETT.